March 14, 1967 M. M. KENSRUE 3,309,497
WELDING BACK PACK
Filed Jan. 21, 1966

Milo M. Kensrue
INVENTOR.
WHANN & McMANIGAL
Attorneys for Applicant

United States Patent Office 3,309,497
Patented Mar. 14, 1967

3,309,497
WELDING BACK PACK
Milo M. Kensrue, 13882 Sandersteed Road,
Santa Ana, Calif. 92705
Filed Jan. 21, 1966, Ser. No. 522,151
5 Claims. (Cl. 219—130)

The present invention relates generally to the art of welding, and is more particularly concerned with improved portable semi-automatic welding apparatus and means for facilitating and controlling the supply of air, inert gas, and electric power together with consumable welding wire or electrode to a manually manipulated welding device which may be operated in a welding zone located at an appreciable distance from the main welding machine.

Heretofore, it has been known to provide portable wheeled vehicles which could be located in proximity to the welding zone, such vehicles being provided with a supply of welding wire and some form of feeding mechanism for pushing the wire to the welding nozzle as it is manipulated by the welder.

Such portable arrangements were an advantage over those arrangements in which the wire had to be fed for a considerable distance from the main welding machine, and wherein the wire friction interferred with the feeding operation. By placing the wire feed closer to the operator, the problem of friction, was eliminated. However such portable equipment including the wire feed mechanism still had the disadvantage of limiting and restricting freedom of movement of the operator within the welding zone adjacent the portable vehicle.

More recently, welding torches have been developed which include the wire or electrode feeding means as a part of the welding torch, the feeding means in this case being arranged to pull rather than push the wire from the source of supply and feed it directly to the torch nozzle. The previously known types of portable wire feeding apparatus are not suited for use with these more recently developed torches, and do not provide a solution to the problem of being able to move freely in a relatively large welding zone or area at a considerable distance from the main welding machine.

Having the foregoing in mind, the present invention in its broad concepts has for an object the provision of a portable welding unit which can be placed near the welder and easily moved from one location to another as the welder changes his welding position from one part of the zone to the other; such welding unit being arranged to supply and control certain of the necessary welding components such as welding wire or electrode, inert gas, electric power and the like.

A further object of the invention is to provide a portable welding unit in the form of a back pack that is so arranged as to house a wire container, such as a reel, and which can be carried and moved with the welder as he changes his location from one point to another in the welding zone, and which further provides a terminus for incoming and outgoing conductors for the gas, air, electric power, electric control lines, and the like.

Another object is to provide a portable welding unit of the above character which includes a control valve for the inert gas supply, so as to materially decrease lag in the movement of the gas between the valve and point of use at the welding nozzle, and thus assure coverage at the start of the weld and eliminate poor and dirty welds.

Still another object of the invention is to provide a welding back pack unit in which the various components are mounted in an insulated closure, which provides a safety protective feature for the welder.

Further objects of the invention will be brought out in the following part of the specification, wherein detailed description is for the purpose of fully disclosing the invention without placing limitations thereon.

Referring to the accompanying drawings, which are for illustrative purposes only:

Figure 1:
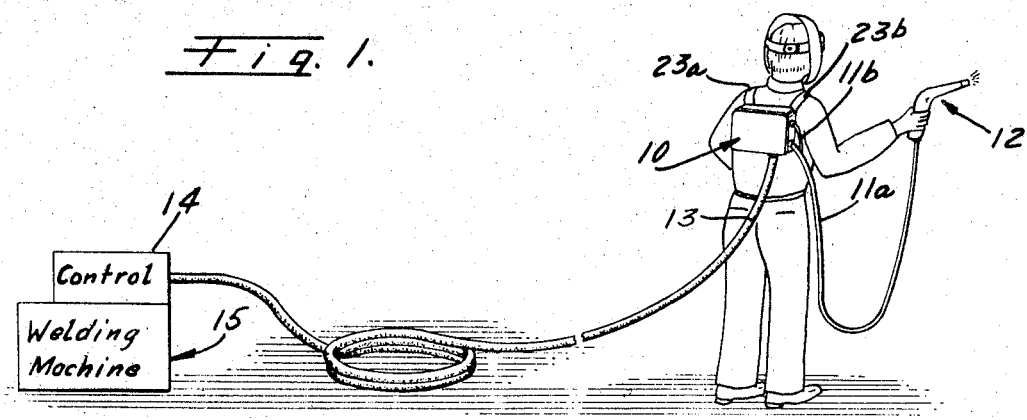
FIG. 1 is a view diagrammatically illustrating the use and operation of the apparatus of the present invention.

Referring more specifically to the drawings, for illustrative purposes, the portable welding unit according to the present invention is disclosed in FIG. 1 as comprising a back pack unit 10 which is provided with outgoing cables or conductors 11a and 11b that connect with a welding torch 12 of the type which is hand manipulated by the welder during the welding operation. An inlet cable or conductor assembly 13 extends from the back pack to a remotely located control mechanism 14 which is associated with a remote main welding machine 15 at a location which may be a considerable distance from the welding zone in which the welder is operating.

In the arrangement just described, it will be appreciated that in using a back pack 10, which is secured to the welder's body, the welder is free to move about in the welding zone without the necessity of having to manually shift the portable welding unit, and the unit will always be at the right position to flexibly and efficiently feed the felding components to the welding torch 12. Moreover, the welder's hands are always free to perform the welding operation and other necessary functions attending the welding operation.

Figure 2:
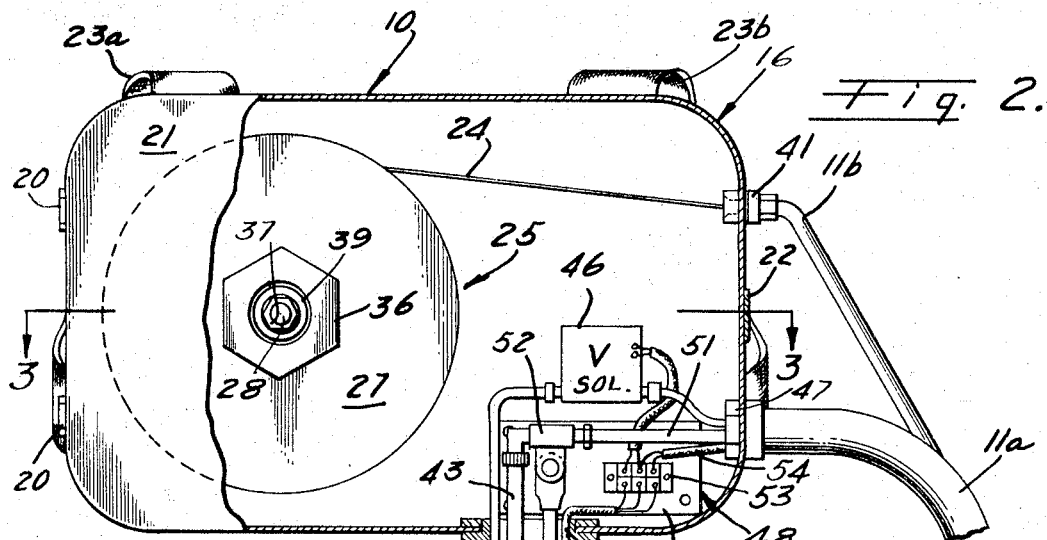
FIG. 2 is a front elevational view of a welding back pack according to the present invention, a portion being cut away to disclose the component parts therein.
Figure 3:
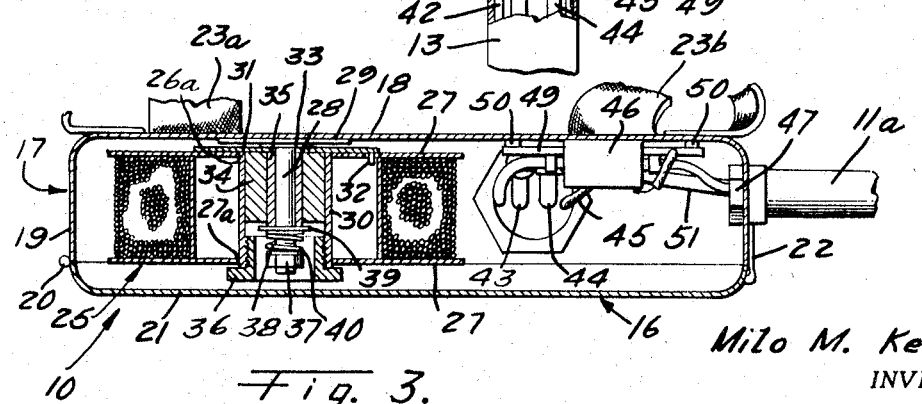
FIG. 3 is a longitudinal section taken substantially on line 3—3 of FIG. 2.

As shown in FIG. 2, the back pack portable unit comprises a housing or enclosure case 16 which is constructed of a fiberglass or other suitable insulating material. The housing or enclosure is in the form of a case having a rather deep main section 17 formed with a back wall 18 and upstanding side wall 19 which is connected as by hinges 20—20 with a swingable lid 21 adapted to be retained in closed position by suitable catch or hasp 22. For attaching the back pack to the body of the welder, the casing is fitted with a pair of shoulder straps 23a and 23b which are looped to receive the arms of the welder therethrough and permit suitable placement of the case on the back of the welder.

The case is arranged to contain a supply of welding wire or electrode 24, which in this case is shown as being wound upon an appropriate spool or reel 25 of conventional construction having end flanges 26 and 27 which contain central openings 26a and 27a respectively.

An axle structure is arranged within the case to mount the reel for rotation. For such purpose, there is provided a spindle 28 that is secured at its innermost end to a mounting plate 29 which is fixedly secured as by rivets or other means (not shown) to the back wall 18. The spindle 28 has a rotatable structure mounted thereon which comprises a tubular member 30 which is adapted to extend through the openings 26a and 27a of the reel. This tubular member is secured as by welding at its innermost end to an end plate 31 which provides an inner abutment for the reel and carries a pin 32 which is adapted to enter an opening in the adjacent end flange and thus connect the parts for unitary rotational movement. The end plate 31 is spaced from the mounting plate 29 by spacer washer 33. Within the tubular member 30, there is provided an annular spacer 34 which carries a central bearing 35 by means of which the rotatable structure is supported on the spindle. The bearing, spacer and tubular member are thus rotatable as a unit.

At the outermost end of the tubular member 30, there is provided a bushing retainer nut 36 which has threaded engagement with the outer end of the tubular member and serves to retain the reel structure connected with the rotatable structure. The outermost end of the spindle 28 is threaded to receive an adjusting nut 37 by means of which a compression spring 38 may be adjusted to vary the drag or braking effect upon the rotation of the reel containing the wire as it is being supplied to the welding nozzle. The ends of the spring respectively bear against washers 39 and 40.

As the welding wire or electrode 24 is unwound from the reel 25, it is fed to an outlet guide bushing 41 which connects with the outlet conductor 11b.

As best shown in FIG. 2, the cable 13 from the control cabinet is in the form of an enclosing sleeve which carries a conduit 42 for the argon or inert welding gas supply, an air line 43, a power cable 44 and a multiconductor electric cable 45. The gas conduit 42 is connected through an electrically operable control valve 46, the outlet of which is carried to an outlet bushing 47 in the case side wall, this bushing connecting with the outlet conductor 11a.

The air line, power cable and electric cable 45 are shown as being brought into terminal means 48 which comprises a small panel 49 of insulating material that is supported at its corners by spacer elements 50 on the back wall 18 of the case.

The power cable 44 is connected to a tubular conductor 51 by means of a connection fitting 52 which is arranged also for connection with the air line 43 so as to admit air to the tubular conductor to serve as a coolant during passage to the torch where the air is utilized to drive the wire or electrode feed means. The tubular conductor 51 is also carried through the outlet bushing 47. The conductors of the electric cable 45 are carried to a terminal block 53 which is mounted on the panel 49. Two of these conductors are carried to the electrical control of the valve 46, while the other conductor and a branch conductor of one of the lines going to the valve 46 are carried through a cable 54 to the torch via the outlet bushing 47. Control of the valve 46 is thus obtained at the torch by the operator. It will be appreciated that since the distance from the valve 46 to the torch is relatively small, supply of gas to the torch will be substantially instantaneous and with a minimum of delay. This is very essential in the elimination of poor and dirty welds.

From the foregoing description and drawings, it will be clearly evident that the delineated objects of the invention will be accomplished.

Various modifications may suggest themselves to those skilled in the art without departing from the spirit of my invention, and, hence, I do not wish to be restricted to the specific form shown and uses mentioned, except to the extent indicated in the appended claims.

I claim:

1. A body carried portable welding unit from which a welding wire is adapted to be continuously supplied to a hand manipulated welding device having power means for pulling the welding wire thereto and feeding it to the welding arc, comprising:
    (a) an enclosure providing a support structure and being adapted for suspending from a welder's body;
    (b) a container for welding wire to be supplied to said device, said container being mounted on said structure; and
    (c) flexible means connected at one end with said support for guidingly carrying welding wire from said container to said welding device, whereby the welder is free to move from one welding position to another without being limited by the length of said flexible means.

2. A portable welding unit according to claim 1, including terminus means mounted on said support structure for anchoring incoming and outgoing fluid supply conductors, and remotely controllable valve means interconnecting the incoming and outgoing fluid conductors.

3. A portable welding unit according to claim 2 in which said terminus means further anchors electric supply conductors, the valve means are electrically operable and adapted to be controlled through a switching circuit at the welding device, and said container, terminus means and valve means are housed in said enclosure, the enclosure being of insulating material.

4. A portable welding unit according to claim 3 in which the electric supply conductors include an outgoing hollow electrical conductor having its interior connected with an incoming air supply, said conductor being connectable at its outer end with said welding device.

5. A portable welding unit according to claim 1 in which the wire container comprises a wire reel rotatably supported on an axle affixed to said support structure, and includes adjustable braking means for controlling rotation of said reel as wire is delivered to said welding device.

References Cited by the Examiner

UNITED STATES PATENTS

| 2,193,977 | 3/1940 | Martin | 219—89 |
| 2,504,868 | 4/1950 | Muller et al. | 219—130 |
| 2,808,498 | 10/1957 | Hudson et al. | 219—130 |
| 2,833,912 | 5/1958 | Royer | 219—130 |
| 2,909,645 | 10/1959 | Berg | 219—130 |

ANTHONY BARTIS, *Primary Examiner.*

RICHARD M. WOOD, *Examiner.*